UNITED STATES PATENT OFFICE.

KEBE TOABE, OF WINCHESTER, MASSACHUSETTS.

PROCESS FOR MANUFACTURING METALLIC CHROMATES.

1,225,374.  Specification of Letters Patent.  Patented May 8, 1917.

No Drawing.  Application filed October 6, 1916.  Serial No. 124,047.

*To all whom it may concern:*

Be it known that I, KEBE TOABE, a citizen of the United States, residing at Winchester, Middlesex county, State of Massachusetts, have invented a certain new and Improved Process for Manufacturing Metallic Chromates, of which the following is a specification.

My invention relates to a process for manufacturing metallic chromates, especially lead chromate ($PbCrO_4$).

The object of my invention is to decrease the cost of manufacturing metallic chromates by making them directly from the metal instead of first preparing salts of a metal.

To carry my improved process of manufacturing lead chromate into effect, I proceed as follows:

100 kgms. of metallic lead, either in the form of pigs, strips, sheets, feathered, powdered or in an otherwise divided condition, are introduced into a suitable vessel, to which is added a solution containing water 90%, chromic acid 10%, nitric acid 1%. The mixture is then heated to 60° centigrade, and reaction allowed to proceed until precipitation ceases. As a result of this reaction, there is formed a heavy bright yellow precipitate and a greenish super-natant solution. The precipitate is then filtered off from the lead which has not been acted upon, washed and dried. Various shades of yellow may be obtained by varying the concentration of the chromic acid used. A 60% chromic acid solution will give an orange yellow product; a 1% chromic acid solution will give a pale yellow product. The reactions involved are:

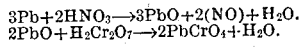

$$3Pb + 2HNO_3 \rightarrow 3PbO + 2(NO) + H_2O.$$
$$2PbO + H_2Cr_2O_7 \rightarrow 2PbCrO_4 + H_2O.$$

These two reactions take place simultaneously, while a possible side reaction producing a green colored solution, may be represented by the following reaction:

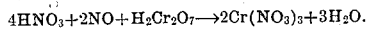

$$4HNO_3 + 2NO + H_2Cr_2O_7 \rightarrow 2Cr(NO_3)_3 + 3H_2O.$$

As a substitute for chromic acid, a solution of sodium bichromate in water, or any soluble salt of bichromate or chromate may be employed. Further, instead of using nitric acid, I may use acetic, formic or sulfuric acids.

Instead of using a solution of chromic acid, chromic oxid or an ore containing chromic oxid, and nitric acid may be used. In such case the mixture of metallic lead, powdered chromic oxid or ore containing chrome oxid, in a finely powdered condition, and a strong solution of nitric acid are heated together at a temperature between 110–140° C., and the heating continued until no further precipitation takes place. A brownish yellow precipitate of chromate of lead will be formed. The reactions involved are:

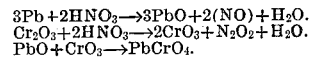

$$3Pb + 2HNO_3 \rightarrow 3PbO + 2(NO) + H_2O.$$
$$Cr_2O_3 + 2HNO_3 \rightarrow 2CrO_3 + N_2O_2 + H_2O.$$
$$PbO + CrO_3 \rightarrow PbCrO_4.$$

Having thus described my invention, I claim:

1. The process herein described for manufacturing metallic chromates, which consists in subjecting the metallic element employed, to a selected temperature between 60° and 140° C., to the action of a solution consisting of water, chromium containing substance and an acid which has a solvent action on the metallic element.

2. The process herein described for manufacturing metallic chromates, which consists in subjecting the metallic element employed, to a selected temperature between 60° and 140° C., to the action of a solution consisting of water, chromic acid and an acid which has a solvent action on the metallic element.

3. The process herein described for manufacturing metallic chromates, which consists in subjecting the metallic element employed, to a selected temperature between 60° and 140° C., to the action of a solution consisting of water, chromic acid and nitric acid.

4. The process herein described for manufacturing metallic chromates, which consists in subjecting the metallic element employed to a selected temperature between 60° and 140° C. to the action of a solution consisting of water, chromium containing substance and an acid which has a solvent action on the metallic element.

5. The process herein described for manufacturing metallic chromates, which consists in subjecting metallic lead, to a selected temperature between 60° and 140° C., to the action of a solution consisting of water, chromic acid and nitric acid.

6. The process herein described for manufacturing metallic chromates, which consists in subjecting finely divided metallic lead, to a selected temperature between 60° and 140° C., to the action of a solution consisting of water, chromic acid and nitric acid.

7. The process herein described for manufacturing metallic chromates, which consists in subjecting finely divided metallic lead, at a temperature of 60° C., to the action of a solution consisting of water 90%, chromic acid 10%, nitric acid 1%.

In testimony whereof, I affix my signature, in the presence of two witnesses.

KEBE TOABE.

Witnesses:
SAMUEL TOABE,
HARRY BERGER.